United States Patent
Akashi et al.

[11] 3,820,623
[45] June 28, 1974

[54] METHOD AND SYSTEM FOR SPEED CONTROL FOR VEHICLES

[75] Inventors: Hajime Akashi, Kyoto; Sosuke Iwai, Uji; Iwao Fujimoto, Komyoda; Hiroshi Hashimoto, Toyota; Tetsuo Abe, Tokushige; Akira Kato, Nagoya; Masao Suzuki, Omimura, all of Japan

[73] Assignee: Sanyo Machine Works Ltd., Aichi-ken, Japan

[22] Filed: Oct. 20, 1971

[21] Appl. No.: 190,933

[30] Foreign Application Priority Data

Oct. 24, 1970  Japan .......................... 45-93753
Oct. 23, 1970  Japan .......................... 45-93793
Oct. 23, 1970  Japan .......................... 45-93795
May 6, 1971    Japan .......................... 46-30256

[52] U.S. Cl. ............ 180/98, 180/105 E, 246/182 C, 246/63 A
[51] Int. Cl. ........................................... B60k 31/00
[58] Field of Search ....... 180/98, 105 E; 246/182 A, 246/182 C, 63 A

[56] References Cited
UNITED STATES PATENTS

| | | | |
|---|---|---|---|
| 3,195,671 | 7/1965 | Wolfe | 180/98 |
| 3,368,639 | 2/1968 | Deane | 180/98 |
| 3,378,102 | 4/1968 | Collin et al. | 180/98 |
| 3,696,882 | 10/1972 | Martin et al. | 180/98 |

*Primary Examiner*—Kenneth H. Betts
*Attorney, Agent, or Firm*—Hall & Houghton

[57] ABSTRACT

A method of controlling the traveling speed of an automobile comprising providing ground oscillating assemblies each consisting of a speed-designating oscillator oscillating at a particular frequency and a transmitting cable embedded in a road; and a car mounted assembly consisting of a receiver unit including an induction coil adapted to obtain electromotive forces respectively corresponding to said particular frequencies by moving through magnetic fields produced by said transmitting cables as the induction coil moves over the transmitting cables, and a plurality of resonance circuits resonating under said electromotive forces with said particular frequencies, said receiver unit being adapted to obtain voltages each corresponding to a target car speed under the action of the resonance circuits, and a control unit adapted to compare such preset voltage with a voltage corresponding to the traveling car speed so that if there is a differential voltage such voltage is utilized to control the engine until the car speed becomes equal to the target car speed, said ground oscillating assemblies being located at desired places on a road so that a magnetic field having a frequency corresponding to a desired car speed is produced at each ground oscillating assembly. The invention also provides methods and apparatuses for controlling the traveling speed of an automobile, having sub-arrangements based on the principal arrangement described above. Advantages and particulars of such arrangements will be made clear.

5 Claims, 19 Drawing Figures

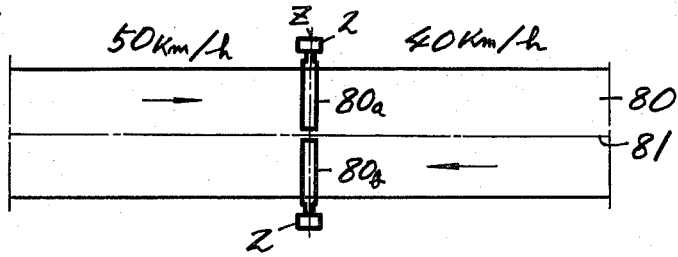
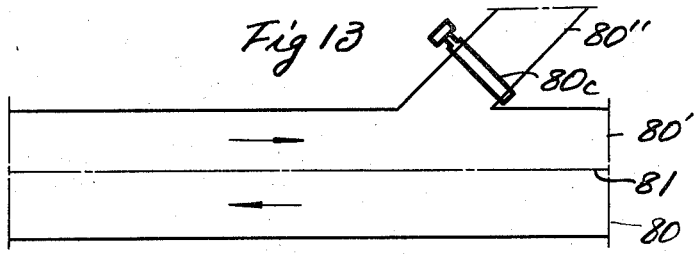
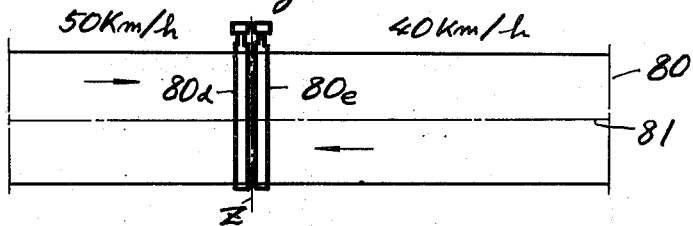
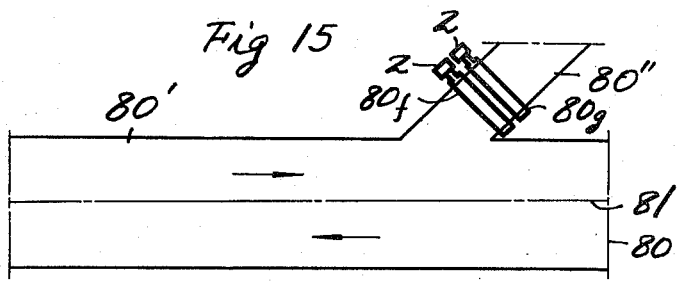
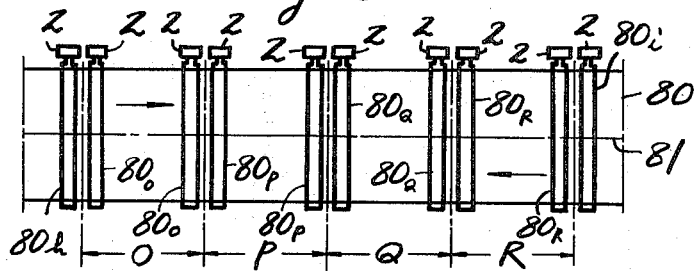

INVENTOR.

BY

METHOD AND SYSTEM FOR SPEED CONTROL FOR VEHICLES

BACKGROUND OF THE INVENTION

1. Field of the Invention

More and more car accidents are now happening and they are due mostly to overspeed driving. There may be cases where overspeed driving is not the direct cause of an accident, but in general it requires great care for the driver to operate the accelerator pedal to control his car speed and consequently the driver is mentally and physically fatigued, which, coupled with the enormous increase of cars, spurs on car accidents.

The present invention has been accomplished in view of the above fact. Thus, it relates to an apparatus for forcibly controlling or regulating the traveling speed of an automobile and the like from the outside by electric means without regard to the driver's will.

2. Description of the Prior Art

In the past, the method of controlling the traveling speed of automobiles and the like has been a very passive one which is to install signal equipment or put up traffic signs at suitable places on roads such as at crossings. In other words, the substantial control of traveling speed has been at the driver's will. As a result, conscienceless driver's often drive at speeds exceeding the regulation speed. Further, it also happens that even a conscientious driver is overspeeding in spite of himself.

SUMMARY OF THE INVENTION

The present invention provides a control system for supervising or controlling the traveling speed of an automobile or the like forcibly from the outside and it also provides actuator and accessory implements for use in said system.

BRIEF DESCRIPTION OF THE DRAWINGS

In the accompanying drawings showing preferred embodiments of the invention:

FIGS. 12 through 16 are schematic views showing transmitters installed in different manners.

DESCRIPTION OF THE PREFERRED EMBODIMENTS

Figure 1:
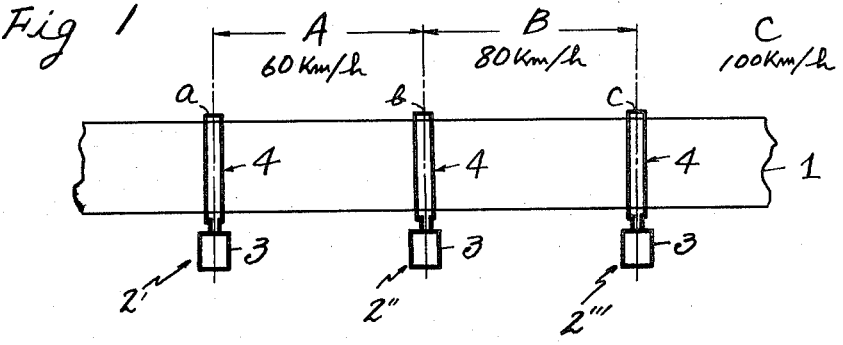
FIG. 1 is a schematic view showing ground assemblies installed in position.

As shown in FIG. 1, a road 1 is divided into three sections A, B and C and in this connection the assumption is made that the regulation speeds for the sections A, B and C are 60km/hr, 80km/hr and 100km/hr, respectively. Ground oscillating assemblies 2', 2'' and 2''' are embedded in the ground at the respective entry ends $a$, $b$ and $c$ of these sections.

Figure 2:
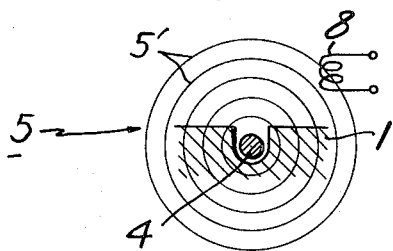
FIGS. 2 and 3 are schematic views showing the relations among a transmitting cable, a magnetic field produced by said transmitting cable embedded in the ground and an induction coil attached to an automobile.
Figure 3:
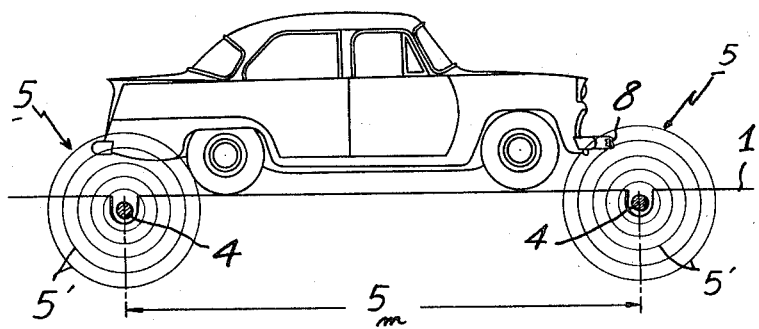

Each ground oscillating assembly comprises a speed-designating oscillator 3 and a looped transmitting cable 4 connected to said oscillator. In the drawings, such transmitting cables 4 are shown embedded in the ground to cross the road 1. As shown in FIG. 2, a magnetic field 5 is produced around the transmitting cable at a particular frequency $fn$ determined by the associated speed-designating oscillator 3. The loop distance of each transmitting cable 4 is about 5 meters, as shown in FIG. 3.

The invention is a system based on the principle of presetting a frequency $fn$ corresponding to a speed, producing magnetic fields at frequencies corresponding to the regulation speeds for the sections A, B and C at the entry ends thereof, detecting such magnetic field at each section by a receiver unit 7 mounted in the automobile, and driving a control unit 18 mounted in the automobile by a detection signal thereby to regulate the traveling speed of the automobile to the target speed.

Figure 4:
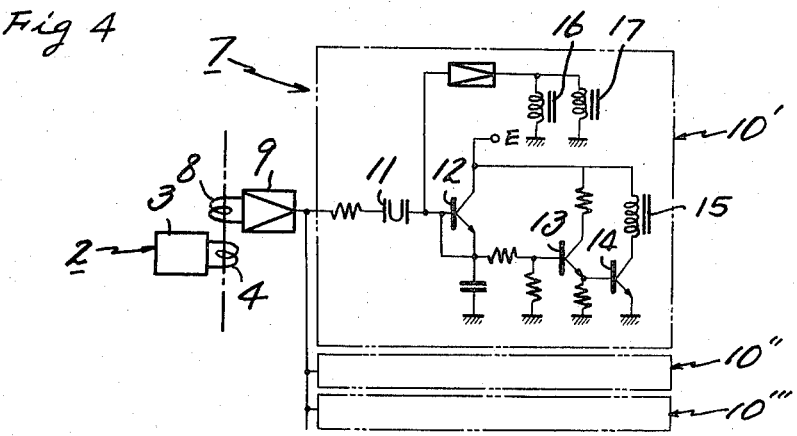
FIG. 4 shows a receiver circuit to be mounted in an automobile.

The receiver unit 7 to be mounted in an automobile, as shown in FIG. 4, comprises an induction coil 8, a current amplifier 9 and a plurality of resonance circuits 10', 10'' and 10''' which resonate at particular frequencies $fn$, respectively. Each of the resonance circuits 10', 10'' and 10''' has a mechanical filter 11 which operates only at a particular frequency associated therewith, a group of transistors 12, 13 and 14 and a keep relay 15. Further, each resonance circuit has relays 16 and 17 for resetting the keep relays in the other resonance circuits.

The induction coil 8 is installed at a suitable place on the automobile so as to cross the lines of magnetic force 5' in the magnetic field 5 produced by each transmitting cable 4.

Figure 5:
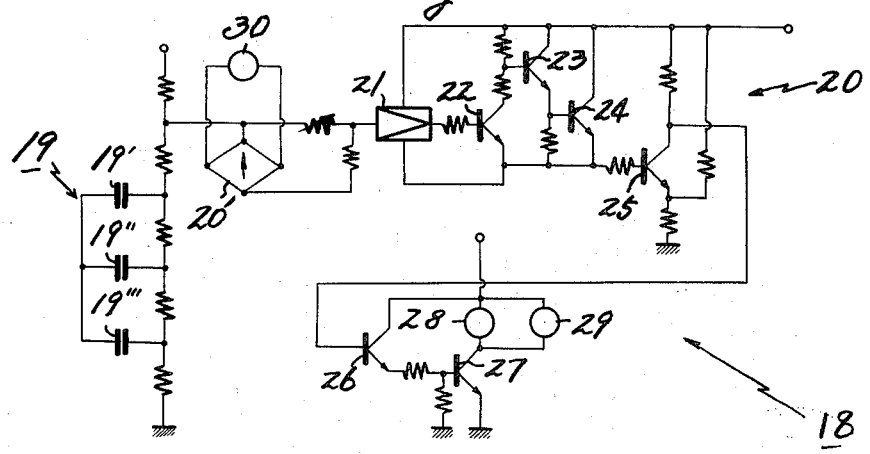
FIG. 5 shows a control circuit to be mounted in an automobile.

The control unit 18 to be mounted in an automobile, as shown in FIG. 5, comprises a car speed presetting part 19 and a part 20 in which the traveling speed is compared with the preset car speed to drive a servomotor 29 on the basis of the result of comparison to throttle the throttle valve of the engine in a direction to decrease the car speed.

With the arrangement thus made, when the automobile enters the entry end $a$ of the section A, the induction coil 8 of the receiver unit cuts the lines of magnetic force 5' in the magnetic field 5, as shown in FIGS. 2 and 3, whereupon an electromotive force corresponding to the particular frequency is induced in the induction coil 8. This induced electromotive force is amplified by the current amplifier 9 and then appears at the output of said amplifier as an output corresponding to the particular frequency $f_{60}$. This output causes only the particular mechanical filter 11 to be operated, resulting in the operation of the keep relay 15 in the resonance circuit 10'. As the particular mechanical filter 11 is operated, the output therefrom drives the resetting relays 16 and 17 of the other resonance circuits 10'' and 10''', whereby the contacts of the keep relays that are operating in the other resonance circuits are turned OFF. By the action of this keep relay 15, a corresponding contact 19' in the car speed presetting part 19 is turned ON, so that a voltage corresponding to the desired car speed is determined at said car speed presetting part. This voltage is the desired preset voltage.

On the other hand, the traveling speed of the automobile is converted into an a-c voltage by an a-c generator 30. The a-c voltage is rectified by a rectifier 20 and then compared with said preset voltage of inverse polarity, and the difference therebetween serves as an input to a servo amplifier 21. The output from the servo amplifier 21 renders transistors 22, 23, 24, 25 and 26 successively conductive. The conduction of the transistor 27 causes the coil 28 of a clutch to be energized to couple the rotatable shaft of a servomotor 29 with the engine throttle valve shaft and at the same time causes said servomotor to be driven, whereby the engine throttle valve is rotated in a direction to decrease the car speed until the output from the servo amplifier 21 becomes zero, i. e., until the automobile attains the preset car speed.

While the description that has been given so far refers to an apparatus adapted to decrease the car speed to the preset car speed by throttling the engine throttle valve when the car speed is greater than the preset speed, it is, of course, possible to provide an apparatus designed so that when the car speed is greater than the preset car speed the engine throttle valve is throttled and conversely when the car speed is less than the preset speed the engine throttle valve is further opened, thereby ensuring that the automobile always runs at the preset speed. In short, it is only necessary to design the rear stage (FIG. 5) of the control unit to be mounted so that it is adapted for constant speed running or overspeed-control running.

The foregoing description refers to controlling the traveling speed of an automobile by use of a servomotor. As for the construction of the control unit for controlling the traveling speed of an automobile, however, besides said servomotor it is also possible to use an arrangement wherein a solenoid-operated clutch is inserted in the accelerating system proper to an automobile, i.e. in the link that connects the accelerator pedal to the throttle valve in the carburetor part so that when the car speed is greater than the preset speed the current through the solenoid of said clutch is interrupted to cancel the connection between the accelerator pedal and the throttle valve, thereby making the driver's accelerating operation ineffective.

Figure 7:
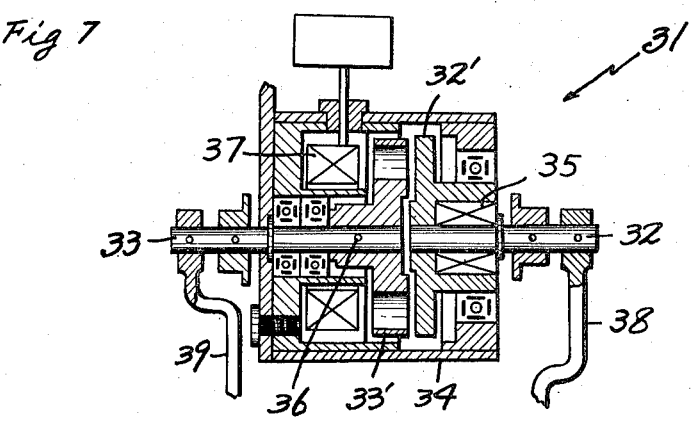
FIGS. 7 and 8 are sectional and perspective views, respectively, of a speed control solenoid-operated clutch to be incorporated in the circuit shown in FIG. 6.
Figure 8:
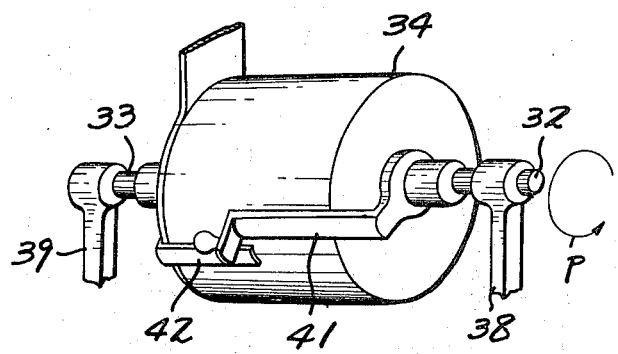

Such arrangement will now be described with reference to FIGS. 6 through 8. FIGS. 7 and 8 show a solenoid-operated clutch 31 as an example. In these Figures, the numerals 32 and 33 denote driving and driven shafts, respectively, opposed to each other in a cylindrical casing 34 and supported for rotation in bearings. The shafts 32 and 33 are provided at their opposed ends with clutch plates 32' and 33', respectively. The clutch plate 32' on the driving shaft 32 is axially slidable and is rotatable together with the associated shaft 32 through a one-way clutch 35 only when the driving shaft 32 rotates in a direction opposite to the direction of arrow P shown in FIG. 8. Thus, when the driving shaft 32 rotates in said direction of arrow P, the meshing at the one-way clutch 35 is canceled so that the driving shaft 32 alone rotates leaving the clutch plate 32' stationary. Further, the clutch plate 33' on the driven shaft 33 is fixedly secured to the driven shaft 33 by a cotter pin 36 and a solenoid is provided in the rear of the clutch plate 33'.

The driving shaft 32 is operatively connected through a link 38 to an operative rod adapted to be operable upon operation of the accelerator pedal. Thus, when the accelerator pedal is operated, the driving shaft 32 is rotated through a predetermined angle. Further, the driven shaft 33 is operatively connected through a link 39 to an arm for opening and closing the throttle valve of the carburetor. When the solenoid 37 is energized, i.e. when a transistor 27' shown in FIG. 6 is turned ON, the solenoid 37 couples the clutch plates 32' and 33' together, and when the transistor 27' is turned OFF, it separates them from each other. This ON-OFF control by the transistor 27' is effected by a signal from the control unit 18 shown in FIG. 6. In short, the transistor 27' becomes OFF when the car speed exceeds the regulation speed and it becomes ON when the car speed falls below the regulation speed. Further, the driving and driven shafts 32 and 33, as shown in FIG. 8, have engagement arms 41 and 42 fixedly secured thereto, respectively, so that when the driving shaft is rotated in the direction of arrow P, the engagement arms 41 and 42 engage each other. The purpose of this arrangement is to prevent the relations between the operation of the accelerator pedal and the degree of opening of the throttle valve from getting out of order, thus ensuring that when the accelerator pedal is released, the driving shaft 32, which is then rotated in the direction of arrow P, catches up with the driven shaft 33.

A concrete example of the construction of the a-c generator 30 for converting the traveling speed of an automobile into an a-c voltage will now be described with reference to FIG. 9.

Figure 9:
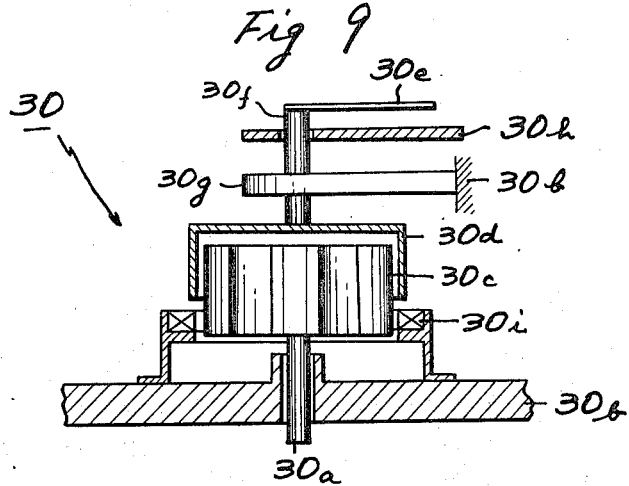
FIG. 9 is a longitudinal section of an a-c generator constructed integral with a speed meter for an automobile.

An a-c generator shown in FIG. 9 serves also as a speed meter. Thus, it is so arranged that at the same time as it indicates the traveling speed of the automobile it generates an a-c voltage in proportion to the traveling speed. In FIG. 9, the reference numeral 30a denotes a rotatable shaft connected to a rotatable part of an automobile, such as the transmission part, through a flexible shaft, which rotatable shaft is supported for rotation in a portion of a meter casing 30b. A permanent magnet 30c is fixedly secured to said rotatable shaft 30a and an electrically conductive cylindrical rotor 30d is opposed to the permanent magnet 30c. A shaft 30f for a pointer 30e is fixedly secured to the rotor 30d in alignment with the axis of the latter, said shaft 30f being aligned with the aforesaid rotatable shaft 30a in spaced opposed relation. The shaft 30f of the rotor 30d is supported for rotation in a portion of the meter casing 30b. A spiral spring 30g has one end fixedly secured to a portion of the meter casing 30b and the other end fixedly secured to the shaft 30f. The rotation of the permanent magnet 30c will produce an eddy current between the permanent magnet 30c and the rotor 30d, whereby the rotor 30d is proportionally rotated against the force of the spiral spring 30g. As a result of the rotation of the rotor 30d, the shaft 30f integral therewith is also rotated together with the pointer 30e to indicate the traveling speed on a dial plate 30h.

A stator coil 30i is stationarily disposed around the permanent magnet 30c, so that when the permanent magnet 30c is rotated, an a-c current is induced in said stator coil. The output from the stator coil 30i is supplied to the control unit 18 shown in FIG. 8 to serve as a car speed detection voltage.

It is believed that the foregoing description has afforded a full understanding of the contents of the present invention.

However, the foregoing description is explanatory of the fundamental principles of the present invention and there may be malfunction in the following case.

For example, in a place where there is noise having the same frequency as that of the electric wave signal being transmitted by the ground oscillator assembly 2' shown in FIG. 1, the control device according to the invention will malfunction. In order to cope with this, the ground oscillating assembly and the receiver unit to be mounted in an automobile may be arranged in the manner shown in FIGS. 10 and 11.

Figure 10:
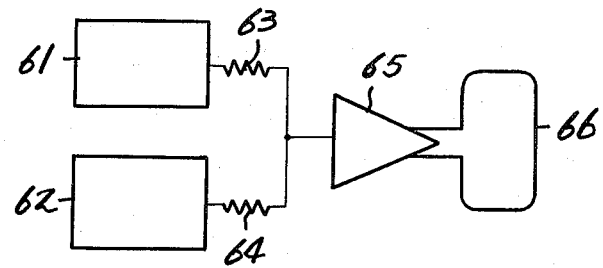
FIG. 10 is a circuit diagram showing another form of ground oscillating assembly.

In FIG. 10 which shows a ground oscillating assembly, the numerals 61 and 62 denote frequency oscillators. The frequency oscillators are adapted to change and adjust their respective frequencies. Normally they are simultaneously used to oscillate at mutually different frequencies. Resistors 63 and 64 are connected to the oscillators 61 and 62, respectively, and the output therefrom is supplied to an amplifier 65 where it is amplified and wherefrom it is supplied to a transmitting cable 66 which, in turn, transmits an electric wave signal at the resultant frequency. It is also possible to provide said different frequencies in turns by adding a chopper changeover circuit.

Figure 11:
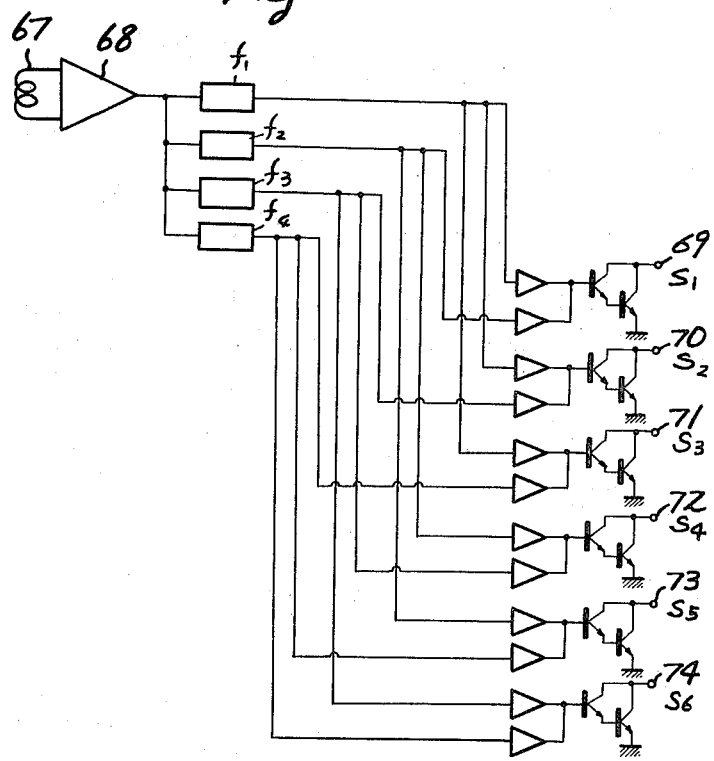
FIG. 11 show a receiver circuit associated with the last-mentioned oscillating assembly and built in an automobile.

FIG. 11 shows the circuit arrangement of a receiver unit to be mounted in an automobile corresponding to the ground oscillating assembly shown in FIG. 10. In this circuit, the electric wave signal transmitted by the transmitting cable 66 of the ground oscillating assembly is received by a pickup coil 67 and amplified by an amplifier 68. Frequency filters $f_1, f_2, f_3$ and $f_4$ are preset at particular values so that different frequencies may be filtered by the different filters. Each filter $f_1, f_2, f_3, f_4$ is designed to derive as its output only an alternating current having a frequency within a particular range from an input having different frequency components. If the four filters $f_1, f_2, f_3$ and $f_4$ are taken two at a time, it is possible to obtain six control signals $S_1-S_6$ at output terminals 69–74. Thus, the filters $f_1, f_2$ are connected to the output terminal 69, the filters $f_1, f_3$ to the output terminal 70, the filters $f_1, f_4$ to the output terminal 71, the filters $f_2, f_3$ to the output terminal 72, the filters $f_2, f_4$ to the output terminal 73, and the filters $f_3, f_4$ to the output terminal 74.

Figure 6:
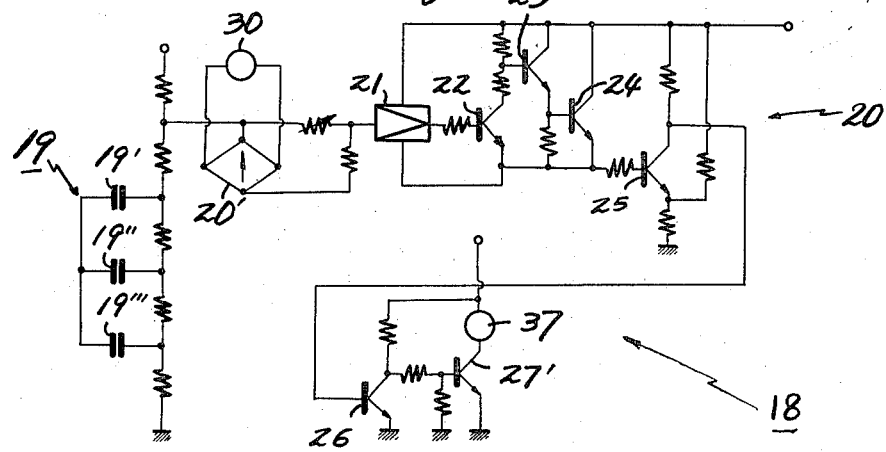
FIG. 6 shows another form of control circuit.

The output terminals described above provide their output signals to the input of the control unit 18 shown in FIGS. 5 or 6.

For example, in order to obtain the control signal $S_1$, the oscillator 61 is adjusted for frequency correspondence to the filter $f_1$ and the oscillator 62 is adjusted for frequency correspondence to the filter $f_2$, so that the resultant of two signals is transmitted from the transmitting cable 66. The resultant signal is received by the pickup coil 67 and is then separated by the associated filters into the two component signals each having its own particular frequency. The signal from the oscillator 61 is derived by the filter $f_1$, while the signal from the oscillator 62 is derived by the filter $f_2$. Therefore, the resultant signal $S_1$ having the resultant frequency appears at the output terminal 69. The control unit is operated by said resultant signal $S_1$. Similarly, by changing the frequencies of the oscillators 61 and 62, it is possible to obtain the other desired resultant signals at the other output terminals. In addition, four frequency filters are shown in FIG. 11, but if five filters are used, ten control signals can be obtained.

To sum up, the ground oscillating assembly is provided with two or more oscillators to transmit a signal having the resultant of two or more frequencies, whereas the receiver unit to be mounted in an automobile is constituted by a plurality of filters each allowing passage of only a signal having a particular frequency, and a signal deriving part which combines the plurality of signals filtered by the filters to provide a desired resultant signal. With this arrangement, it is possible to exclude malfunction due to noise and the like. That is, even if there is noise having the same single frequency, no control signal is produced. The probability that noise having the same resultant of a plurality of frequencies as the resultant signal will be produced is very little. Therefore, there is almost no malfunction and automobiles can be safely controlled. Further, since the number of control signals to be derived can be increased in a manner similar to geometric progression by the combination of frequency filters, even if the number of such control signal is increased the construction of the internal circuit of the receiver unit can be made simple and inexpensive.

The method of installing the transmitting cable of the ground oscillatig assembly on a road will now be described.

Generally, a road 80 has a center line 81 drawn in the middle as shown in FIG. 12 to distinguish between rightward and leftward travel lanes. In the case of speed regulation on such road 80, transmitting cables will be installed at the boundary Z between the regulation sections. For example, in the case where the righ-hand side of the boundary Z is a section for 40km/hr and the left-hand side is a section for 50km/hr, a transmitting cable 80a for 40km/hr regulation signal is installed in the rightward travel lane and a transmitting cable 80b for 50km/hr regulation signal is installed in the leftward travel lane. In this case, however, if an automobile running on the rightward travel lane goes across the center line 81 at a point just short of the boundary Z to enter the leftward travel lane, goes across the boundary Z and again curves across the center line to return to the rightward travel lane, then it follows that the automobile can run at the regulation speed of 50km/hr also on the right-hand side of the boundary Z.

Further, in the case where an arterial road 80' such as expressway has a branch road 80'', as shown in FIG. 13, a transmitting cable 80c is installed at the exit to the branch road. If, however, an automobile enters the branch road 80'' across the transmitting cable 80c by mistake and, with the driver immediately noticing the mistake, backs to the arterial road 80', the automobile will since then be sujbected to the speed regulation by the transmitting cable 80c, so that it will have to run at this regulation speed.

In order to eliminate these inconveniencies, as shown in FIG. 14, a transmitting cable 80d for the speed regulation of head-on cars (i.e. cars approaching from the opposite direction) is pleased on this side of the boundary Z so as to extend over the entire width of the road and on the other side a transmitting cable 80e for speed regulation of incoming cars is placed side by side with said transmitting cable 80d. With this arrangement, all cars passing across the boundary Z receive signals twice without fail and have their speed regulated by the second signal. Further, as shown in FIG. 15, at the exit to the branch road 80'' from the arterial road 80', a transmitting cable 80f for arterial road speed regulation is placed on this side and on the other side a transmitting cable 80q for branch road speed regulation is placed side by side therewith. Further, as shown in FIG. 16, when the road 80 is divided into speed regulation sections O, P, Q and R, a speed regulation cancel transmitting cable 80h is placed outside the left-hand end of the section O, transmitting cables $80_o$ for section O are placed one at each end of the O, transmitting cables $80_p$ for section P are placed one at each end of the section P, transmitting cables 80q for section Q are placed one at each end of the section Q, transmitting cables $80_r$ for section R are placed one at each end of the section R, and a speed regulation cancel transmitting cable 80i is placed outside the right-hand end of the section R.

With these arrangements, it is possible to cause automobiles passing over various sections on each lane to run at the particular regulation speeds allotted the respective sections.

Figure 17:
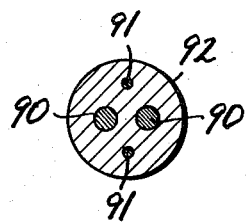
FIGS. 17 through 19 are perspective views showing means for protecting a receiver coil against intentional severance.
Figure 18:
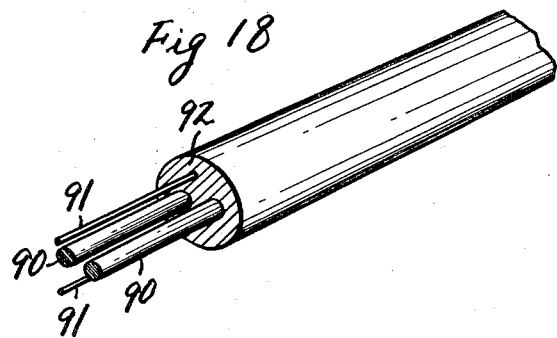
Figure 19:
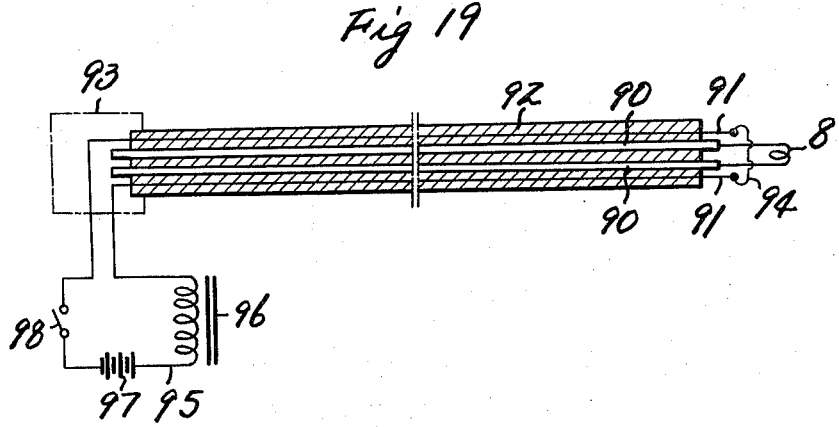

FIGS. 17 through 19 show special electric wires protected against such a meddling as to disable the present invention from the execution of its function i.e. speed control function.

In FIGS. 17 through 19, the reference numeral 90 denotes a wiring leading to the receiver coil 8 and 91 denotes a conductor for severance-preventive circuit disposed adjacent the wiring 90, and these are enclosed in an insulating covering. The wiring 90 has one end connected to a receiver unit 93 and the other end to the receiving coil 8. The conductors 91 for severance-preventive circuit are connected together on the receiving coil side by a conductor 94 and are connected in series at the other end to an ignition circuit 95 for an engine. With this arrangement, if the cable is severed with the intention of severing the receiving coil wiring 90, the circuit for the ignition coil 96 is also broken, with the result that the automobile becomes unable to run. In addition, in FIG. 19, the reference numeral 97 denotes a battery and 98 denotes a switch.

Whiles there have been described herein what are at present considered preferred embodiments of the several features of the invention, it will be obvious to these skilled in the art that modifications and changes may be made without departing from the essence of the invention.

It is therefore to be understood that the examplary embodiments thereof are illustrative and not restrictive of the invention, the scope of which is defined in the oppended claims and that all modifications that come within the meaning and range of equivalency of the claims are intended to be included therein.

We claim:

1. A system for controlling the traveling speed over a roadway of a throttle controlled automobile, which system comprises, in combination:
    a. Ground assemblies each comprising a target speed designating oscillator oscillating at a particular speed control frequency and having a transmitting cable embedded in the roadway, and
    b. Control means adapted to be mounted on the automobile for limiting the speed of the automobile to the target speed corresponding to said frequency, and comprising:
        1. target signal deriving means having
            i. an induction coil for picking up the speed control frequency signal by moving through the field of one of said transmitting cables, and (ii) means for deriving from said speed control frequency a first direct current corresponding to said frequency,
        2. means for generating an actual speed signal at a frequency corresponding to the actual speed of the automobile and for deriving a second direct current therefrom, and
        3. means for controlling the throttle of the vehicle in response to a difference in the said first and second direct currents to adjust the actual speed of the automobile to the target speed corresponding to said speed control frequency,
    said system comprising the improvement that
        4. said target signal deriving means comprises a plurality of resonance circuits each resonant to a different one of said speed control frequencies, each of said resonance circuits generating an output signal when resonating, and each of said resonance circuits comprising (i) keep-relay means activated by its said output signal for controlling the value of said first direct current to correspond to said frequency, and (ii) reset relay means actuated by its said output signal for deactivating the keep-relay means of the remainder of said resonance circuits.

2. An improved speed control system as claimed in claim 1, wherein
    d. said ground assemblies each emit a plurality of signals of different frequencies forming components of said speed control frequency signal, and
    e. said target signal deriving means comprises filter means for segregating the said components of the picked up speed control frequency signal and means responsive to the so segregated components of the signal for deriving said first direct current.

3. An improved speed control system as claimed in claim 1, wherein
    d. the roadway comprises a first speed zone and a second speed zone contiguous thereto, each of said zones having entrance and exit ends, and wherein ground assemblies providing the particular speed control frequencies for each of said zones are located at both the entrance and the exit end of each of said zones, whereby at the junction of the two zones the frequency of the second assembly passed by the induction coil determines the speed control frequency for the automobile in which it is mounted.

4. An improved speed control system as claimed in claim 1, wherein
    a. said roadway is a two-way traffic roadway, with a boundary line between oppositely directed traffic lanes thereof, and a ground assembly for speed control of traffic moving in a first one of said lanes has its transmitting cable extending across both said lanes and is immediately preceded, in the direction of traffic in the said first lane by the transmitting cable of a ground assembly for speed control of traffic moving in the oppositely directed lane which also extends across both said lanes, whereby the speed control desired for traffic in each of said oppositely directed lanes is maintained even though a controlled automobile crosses said boundary line at the location of said ground assemblies.

5. An improved speed control system as claimed in claim 1, wherein said induction coil is connected in said control means by insulated conductor means, and wherein said insulated conductor means further comprises a circuit therein for enabling operation of the automobile so that, if said insulated conductor means is severed, operation of the automobile is disabled.

* * * * *